(12) United States Patent
Montagnino et al.

(10) Patent No.: US 10,845,072 B2
(45) Date of Patent: Nov. 24, 2020

(54) EVAPORATIVE HUMIDIFIER-AIR PURIFIER COMBO

(71) Applicants: James G Montagnino, Saint Charles, IL (US); Dirk Niedermann, Chicago, IL (US); Li Kin Wan, Fanling (HK)

(72) Inventors: James G Montagnino, Saint Charles, IL (US); Dirk Niedermann, Chicago, IL (US); Li Kin Wan, Fanling (HK)

( * ) Notice: Subject to any disclaimer, the term of this patent is extended or adjusted under 35 U.S.C. 154(b) by 261 days.

(21) Appl. No.: 15/985,005

(22) Filed: May 21, 2018

(65) Prior Publication Data

US 2019/0353362 A1 Nov. 21, 2019

(51) Int. Cl.
*B01D 35/30* (2006.01)
*B01F 3/04* (2006.01)
*F24F 6/04* (2006.01)
*F24F 13/28* (2006.01)
*F24F 13/20* (2006.01)
*F24F 6/00* (2006.01)

(52) U.S. Cl.
CPC ............. *F24F 6/043* (2013.01); *B01D 35/30* (2013.01); *B01F 3/04085* (2013.01); *F24F 13/28* (2013.01); *F24F 2006/008* (2013.01); *F24F 2006/046* (2013.01); *F24F 2013/205* (2013.01)

(58) Field of Classification Search
CPC .. B01D 35/30; F24F 6/043; B01F 3/04; B01F 3/04085
See application file for complete search history.

(56) References Cited

FOREIGN PATENT DOCUMENTS

KR 2018044568 A * 5/2018 ............... F24F 13/10

* cited by examiner

*Primary Examiner* — Robert A Hopkins
(74) *Attorney, Agent, or Firm* — Steven Ivy P.C.

(57) ABSTRACT

It is an Evaporative Humidifier Air Purification combo unit performing the functions of both cool mist evaporative air humidifier as well as the air purifier. The optional attachments make it easy for the consumers to make use of any of the functions it is capable of performing. It even solves the problem of degradation of performance and material life prevalent in conventional standalone air purifier units. The evaporative humidifier is motor driven and is provided with proprietary HEPA quality nano membrane with high chemical stability, waterproof, water vapor permeability, windproof, breathable, acid and alkali resistant, anti-corrosion and anti-bacteria functions etc. membrane used in combination with humidifier cooler pads. On using the water tank, the setup performs the function of air humidifier using the air sucked from the wick using the fan and aiding the evaporation of water in the tank. While on replacing the water tank with the air cover, the same fan sucks air through wick and blows the purified air upwards in consonance to the mode i.e. High, Medium or Low.

18 Claims, 11 Drawing Sheets

Perspective view of the Air Purifier

Perspective view of the Evaporative Humidifier

Fig. 1

Front view of the Air Purifier

Perspective view of the Air Purifier

Fig. 2

Front view of the Evaporative Humidifier

Fig. 3

Perspective view of the Evaporative Humidifier

Top view of Fan components showing Fan

Top view of Fan components without Fan

Fig. 6

Perspective view of Air Filter unit

Fig. 7

Perspective view of water reservoir

Perspective view of Water Tank

Bottom view of Base

EVAPORATIVE HUMIDIFIER-AIR PURIFIER COMBO

FIELD OF INVENTION

The present invention is generally related to the combination of cool mist evaporative humidifiers and air purifier apparatus, and more particularly related to the room humidifiers working on the principle of evaporation using a fan and a wick and with an optional attachment of air purifier unit for air purification.

BACKGROUND OF INVENTION

Humidifiers have been observed to be exceptionally valuable in raising the moistness of air introduced inside homes, especially amid times of extremely dry climate or in winter, when outside demeanor of low temperature is drawn inside a home and warmed, making the relative stickiness inside the house be brought down to an awkward level. Under these conditions it is useful to bring dampness into the air. A few sorts of humidifiers, utilized for expanding mugginess in a room or walled in area are outstanding in the workmanship. Cases of these incorporate steam-sort humidifiers, ultrasonic humidifiers, warm-air humidifiers and evaporative humidifiers.

There have been numerous attempts to produce an evaporative humidifier. One such example has been disclosed in the French Patent No. 1,261,072 to Schiesser which depicts a humidifier having a centrally located fan assembly surrounded by an annular water reservoir. Cylindrically shaped water absorbing wicking means is disposed within the reservoir adjacent to the outside diameter wall. A portion of the wicking means is submerged in the water and through capillary action the entire wick becomes water saturated. As an air stream, generated by the fan, flows over the wick, the air becomes humidified and is expelled to the outside surrounding environment. But it doesn't address the problem of deterioration of the Wick or the wicking material affecting the efficiency of the humidifier due damp air.

Inventions so far have been successful enough to solve the problem of the clogging of the absorbing material due to scarcity of fluid available with the reservoir. U.S. Pat. No. 3,864,437 granted on Feb. 4, 1975 to Blaszkowski, discloses an apparatus for humidification having a water receptacle that is vertically expandable and collapsible. It is provided with a float at its upper end connected to the side wall of the receptacle. A humidifying means comprises a water absorbing, air permeable annular wall and/or a water slinger driven by an air impeller. Rotating fan blades of a fan assembly draw air into the water absorbing angular wall causing the air to absorb moisture, which is then directed back into the room. The water absorbing annular wall and the fan assembly are supported on the float, and as the water level recedes the whole assembly descends, so that the lower end of the wall always remains immersed in the water. Hence, it might not be regulating in nature and would result in inconvenience to the people in its vicinity.

Technology has been developed to even tackle with the problem of the scarcity of water in the reservoir available with the wick to absorb by capillary action. As stated in U.S. Pat. No. 4,698,188 to Gutmann, which was issued on Oct. 6, 1987, includes a humidifier comprising a housing having an upper and lower part. The upper part includes a fan assembly and the lower part forms a water chamber. The humidifier further includes an intermediate part located within the housing. The intermediate part is slid able within the housing and floats on the water surface. The intermediate part includes an air permeable and water absorbing mat. The lower portion of the mat is in contact with the water which is drawn up the sides of the mat by capillary action. A stream of air generated by the fan evaporates the water from the mat dispersing it to the surrounding environment. As the water is evaporated, the reservoir level drops and the entire intermediate part moves downwardly with the falling water level. Therefore, the lower part of the evaporative mat is always submerged in the water to the same depth so that the capillary action of the evaporative mat remains constant independent of the water level. But still, it fails to solve the problem of the failure of wick due to the damp air or moisture.

Some of the inventions aimed at combining an attachment or an additional function to the humidifier unit. U.S. Pat. No. 4,752,423, to Wong, which issued Jun. 21, 1988, describes a combined humidifier and fan heater unit which includes a humidifier part electrically operable to dispense water vapor into the surrounding air space for humidifying purposes, and a fan heater part electrically operable either together with or instead of the humidifier part to draw air from the surrounding air space, through heating means, by which it is raised in temperature or not as desired, and passed back into the surrounding air space. Such technology did fail to render air purification required for long life of the apparatus.

U.S. Pat. No. 4,089,915, to Jackson, which issued May 16, 1978, describes a self-sterilizing humidifier for air to be breathed, the humidifier being of the type having an endless porous media driven to be progressively immersed in a receptacle. Means are shown for periodically providing throughout the effective volume of water in the receptacle heated water at a temperature above about 180° F., while the media drive is actuated, the heated water being sufficient to progressively expose the media to bacteria-killing conditions. In one embodiment a heater chamber automatically discharges a charge of water heated above about 180° F. into the receptacle. In one such case a thermal actuator has sensitive parts exposed to water in both the heater chamber and the receptacle, the actuator releasing the charge when water in the receptacle lies below its sensitive part, and water in the heater chamber has reached or exceeds the selected high temperature. In another embodiment the heater element is in the receptacle and is periodically energized to maintain bacteria-killing conditions. But it cannot serve the purpose of cool humidifier in its surroundings.

Although various technologies have been evolved for the development of cool mist humidifier, but none of them discloses a humidifier combined with an air purifier unit which can either be used in combination to the humidifier or independently. Also, the humidifier is self regulating and so facilitates release of adequate vapors in its surrounding in relation to the atmospheric humidity and making the environment comfortable.

Therefore, the current unit serves the purpose of humidification by means of evaporation which is self regulating depending upon the relative humidity and also the presence of nano membrane filtration material makes it workable even in wet environment unlike HEPA material. The air purification unit usable as an attachment with the apparatus adds to the functionality of the device.

SUMMARY OF INVENTION

Hence, it is an objective of the present invention to provide an apparatus for mist humidification and air purification in one frame that comprises a humidifier in combination with an air purifier. In an embodiment, the evaporative humidifier incorporates formation of mist by evaporation of water using a fan application and improving the humidity of the room/surrounding by application of mist.

It is further an objective of the present invention to employ a nano membrane filtration material to work in a wet environment which is not possible for a HEPA filter, which is the basis for the unique capabilities of this product:

It is also an objective of the present invention to provide adaptation of an air purification in combination with evaporative humidifier.

It is a further objective of the present invention to use removable filter & wick frame enclosures to allow interchange of both elements.

It is a further objective of the present invention to Adapts ion technology to enhance conditioning effects of air cleaning & humidification.

The foregoing and other objects, features and advantages of the invention will be apparent from the following more particular descriptions of exemplary embodiments of the invention.

Preferably, the Evaporative Humidifier-Air Purifier combo system for controlling room humidity and purifying the air, said evaporative Humidifier-Air Purifier combo comprising of the Evaporative Humidifier and Air Purifier for combined and independent working.

Preferably, the Evaporative Humidifier apparatus to maintain the ideal humidity in the room, which further comprises of a base mounted on said Evaporative Humidifier-Air Purifier combo, a replaceable filter support having at least two set of wicks mounted laterally to a filter support to absorb the moisture content from an incoming air, a water reservoir mounted internally immediately at the base to maintain a desired quantity of water and to receive water for the replaceable set of wicks, a replaceable water tank mounted at the top of the humidifier to pass the water automatically from the top to the water reservoir for absorption of replaceable set of wicks, a water outlet pipe mounted downwardly on said water tank to pass the water to the water reservoir, a motor mounted on a fan box to supply current to the combo.

Preferably, the Air Purifier apparatus to purify said entering air, which further comprises of a replaceable air filter unit mounted laterally to the frame to absorb the contaminants of the incoming air, an air cover mounted at the top of the frame to pass the outgoing air from the combo, a power source to give electric power to the said combo, an output means to indicate the working condition of said apparatuses.

Preferably, said evaporative humidifier and said air purifier works intraoperative mounted on the single frame depending on selecting the use of either one of the said apparatuses or both in combination.

Preferably, the output means refers to a light indicator and noise indicator.

Preferably, the combo system further comprising a fan mounted in said fan box connected to said motor by wire arrangements to receive current and an input means mounted internally and externally on the frame respectively.

Preferably, the combo system has input means which is a manual user selection mode having touch buttons to activate a low mode, a medium mode and a high mode and it may also have a simply rotary selector switch, actual buttons, a slide selector or a smart panel that may operate from manual working, cell phone or any other wireless communication technology.

Preferably, the fan is an electric fan capable of producing 500-900 RPM at said low mode, 800-1200 RPM at said medium mode or 1100-1500 RPM at said high mode.

Preferably, the mist rate is maintained as 70-90 g/h at said low mode, 110-130 g/h at said medium mode or 150-170 g/h at said high mode.

Preferably, the low mode, said medium mode and said high mode corresponds to said power source giving power wattage of 6-10 Watt, 9-13 Watt or 13-17 Watt respectively.

Preferably, the low mode, said medium mode and said high mode corresponds to the noise measured at 36 inches in front of the front panel of combo as 55 dBA, 60 dBA and 71 dBA respectively.

Preferably, the low mode, said medium mode and said high mode corresponds to the light indicator turns on one blue LED light, turns on 2 blue LED light or turns on 3 blue LED light respectively.

Preferably, the low mode, said medium mode and said high mode corresponds to a maximum time of cut off at 47 hours, 30 hours or 22 hours respectively.

Preferably, the evaporative humidifier and air-purifier are mounted on one frame to allow intraoperative working.

Preferably, the combo system is adapted to have a filter support unit to mount said at least two wicks and/or said air filter unit.

Preferably, said at least two set of wicks and air filter is made of a paper, filter paper, HEPA, PTFE, open cell Foam Felt, charcoal, woven filter such as used in HVAC system, electrostatic or any combination of.

Preferably, at least two set of wicks and/or said air filter positioned central to the longitudinal axis at the system surface are sandwiched between a filter support top and filter support bottom.

Preferably, said Humidifier is always set on default as ON for independent working over Air Purifier.

Preferably, said humidifier is self-regulating depending on the room humidity, as the humidity of the room increases, the water vapor output naturally decreases.

Preferably, the humidifier works without the water tank and uses only the water reservoir at the base with peristaltic pump to wet said at least two replaceable set of wicks.

Preferably, the humidifier employs the use of a PTFE or Nano Membrane filter at exit for the outgoing air.

Preferably, said Air Purifier is set on default as OFF over said humidifier and can be switched to ON by a user selection for independent working of said Air Purifier.

Preferably, said fan located adjacent to said filter unit sucks said incoming air into said air purifier and blows out upward into the room.

Preferably, said filter unit is replaced with said at least two set of wicks to activate independent working of said air purifier.

Preferably, said base has at least four feet located at the bottom of said base.

Preferably, said humidifier and said air purifier are adapted to be arranged and configured as independent apparatuses as an optional arrangement.

Preferably, the evaporative humidifier-air purifier combo system comprises of a humidifier, an air purifier, a fan box in the fan chamber, a fixed at least two set of wicks, a fixed air filter unit, a water reservoir mounted on a base and an air cover.

Preferably, the fan sucks the incoming air inside the fan chamber passed through the fixed set of wicks and causes evaporation of water from the water reservoir to form a desired moist air.

Preferably, said desired moist air then passed through the outlet area of said humidifier to said air purifier mounted on the humidifier for purification of said moist air.

Preferably, said air purification is performed by an air filter unit purifier having HEPA type filters which is a type of mechanical air filter and works by forcing air through a fine mesh that traps harmful particles such as pollen, pet dander, dust mites, and tobacco smoke and forms a pure air.

Preferably, said pure air is passed as an outgoing air into the room from the top of the air purifier.

Preferably, said pure air may be passed through a charcoal filter for fine purification.

Preferably, said charcoal filter may be mounted on the humidifier and/or air purifier.

BRIEF DESCRIPTION OF THE EMBODIMENTS

The manner in which these objectives and other desirable characteristics can be obtained is explained in the following description and attached figures in which.

DETAILED DESCRIPTION

This patent describes the subject matter for patenting with specificity to meet statutory requirements. However, the description itself is not intended to limit the scope of this patent. The principles described herein may be embodied in many different forms, while being used individually or jointly.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

This patent describes the subject matter for patenting with specificity to meet statutory requirements. However, the description itself is not intended to limit the scope of this patent. The principles described herein may be embodied in many different forms, while being used individually or jointly.

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to the drawings in general and to FIGS. 1 to 11 in particular, an evaporate humidifier with air purifier combo embodying the teachings of the subject inventions is generally designated as 30. The term 'evaporative humidifier' refers to a humidifier that employs a fan 04 to conduct forced convection of an air stream that is sucked inside the humidifier 100 by the fan 04 through a set of wicks 06. The set of wicks 06 are generally made up of water retaining element to absorb moisture content of the sucked-in air. Thus, the flow of air inside the evaporative humidifier 30 causes evaporation of water that is reserved in the water reservoir 08 kept on the base 10 of the humidifier 100 isolated from outside surroundings.

The frame 60 of the humidifier with air purifier combo 30 has a front view, first side view, second side view, rear view and bottom view. The outside periphery or the external portion 82 of the humidifier air filter combo 30 is made of material like plastic, alloy or others which is free of scratches, cracks, dents, blemishes, contamination, warpage, corrosion and misalignment of mating parts and the internal arrangements 84 of the evaporative humidifier air purifier combo 30 is free from oil and other lubricants that can affect the efficiency of the system, apparatus or device 30. The external portion 82 and internal portion 84 of the humidifier 100 does contain an evenly coating of a selective biocide, pesticide or any other coating that restricts the growth of bio-organism at any portion of the humidifier 30. This makes the apparatus 30 pesticide controlled and insect preventive even in presence of water accommodation inside the apparatus 30 at the water reservoir 08, water outlet pipe 14 and water tank 02. The same coating is applied by dipping the set of wicks 06 and air purifiers 42 before the assembly is prepared to make it biocide controlled as water in various forms and air containing impure contaminants may give birth to bio-organisms and being so, it would deteriorate the life and usability of the apparatus 30.

The evaporative humidifier air purifier combo 30 system is a novel combination of an evaporative humidifier 100, to maintain an accurate level of humidity inside a room, hall, or any other building adopted with this apparatus 30, and the other embodiment is the air purifier 40 which may work independently of or combination with the evaporative humidifier 100. Whatever be the case, both the units are adopted on one frame 60 and has removable equipments like the wicks 06, air filters 42, water tank 02, air cover 44, water reservoir 08 and other embodiments of the humidifier-filter combo which are interchanged as per the working requirement of the user.

Figure 1:
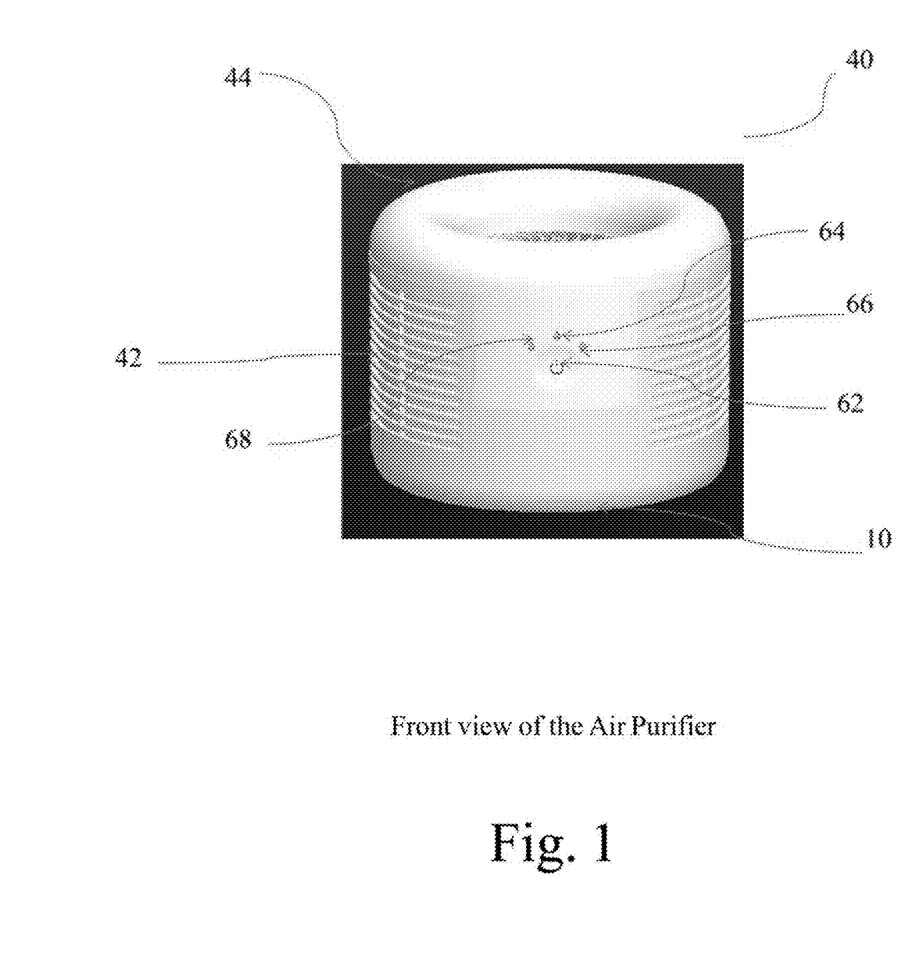
FIG. 1 shows a front view of an air purifier

As shown in FIG. 1, the Air Purifier 40 is a compact interoperative device working on dual mode principle. The principle of air purification is embodied in this device which is made available now with more advanced features and improved technology to purify the impure air and make the environment clean and healthy. The fan 04 blows and sucks in the outside air through the air filter unit 42 which while entering the device is passed from the air filters and all the impurity is left absorbed on the air filters. The air filter can be any conventional air filter available at large. The air purifier 40 is an isolated chamber which works in a sterile environment to blow out only clean air in to the outside environment. A repetitive process of air filtration makes the air clean at large. The air purifier can be a paper, foam, filter paper, or any other such cleaning material.

Figure 2:
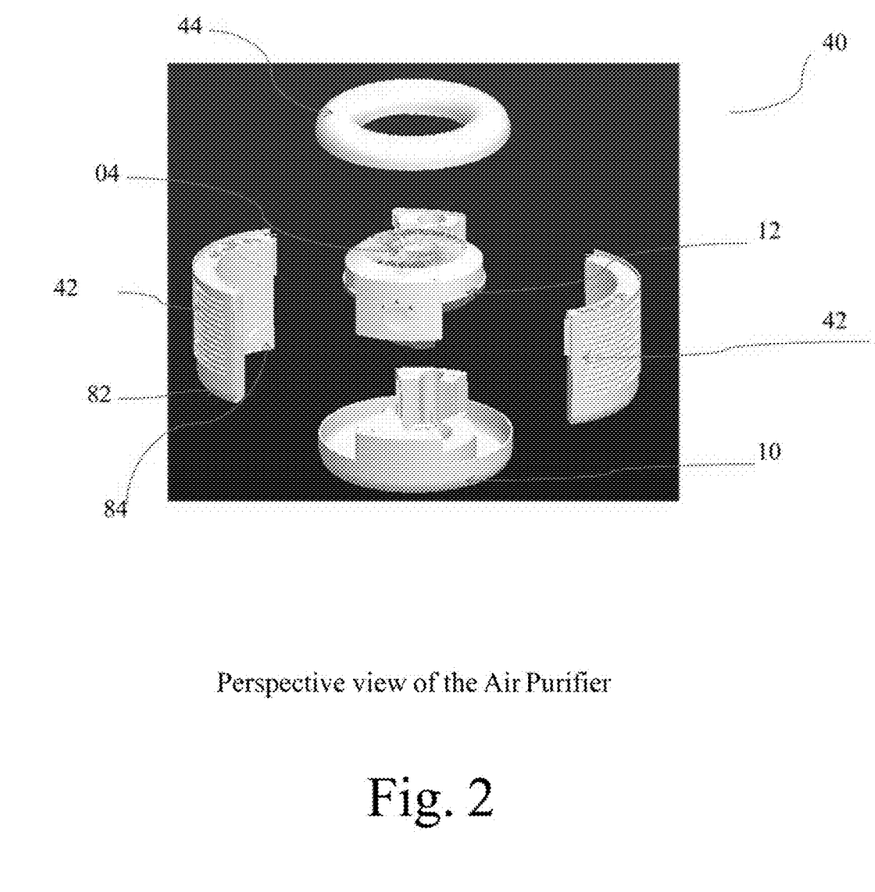
FIG. 2 shows a front view of an evaporative humidifier

As shown in FIG. 2, the Air Purifier 40 is a cylindrical shaped body with longitudinal axis having a air cover 44, base 10, Air Filter Unit 42, a fan 04, etc. The Air Purifier 40 works self controlled with the air filter unit 42 forming a central portion of the unit 40, having a highly fined filter material which may be any adapted to sustain any air filter material available in the market as per the purification requirement.

As shown in FIG. 2, the Air Purifier 42 has an external portion carrying centrally located air filter unit 42 which is a removable and interoperative unit to replace the set of wicks when replaced for evaporative humidifier. Further it contains an Air Cover 44 to allow the cleaned air to pass to the outside surrounding from the Air Purifier 42.

Figure 3:
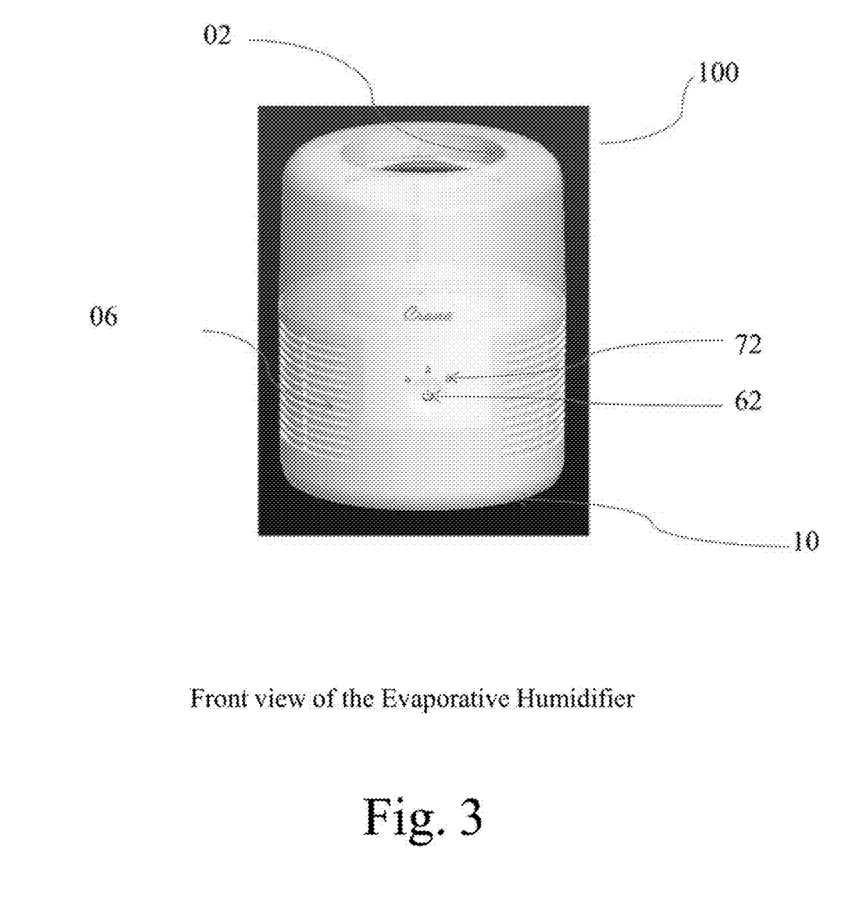
FIG. 3 shows a perspective view of the Evaporative Humidifier showing arrangement of components attached, in accordance with an embodiment of the present invention.

As shown in FIG. 3, the evaporative humidifier 100 system is developed with a self regulating mechanism to control the humidity in the room as on ideal basis depending on the relative humidity conditions. Relative Humidity is the ratio of the partial pressure of water vapor to the equilibrium vapor pressure of water at a given temperature. The evaporation from the evaporative humidifier 100 depends upon the amount of moisture in the environment i.e. relative humidity. When the moisture in the atmosphere is low, the air available in the surroundings is more and so more evaporation is attained leading to a higher rate of mist evaporation. On the contrary, when the surroundings experience high humidity rate, the available air for the fan to blow through the wick is less and so less evaporation occurs. This amount to comparatively less output out of the humidifier 100 and so the evaporative humidifier 100 is said to be self-regulating as the working principle of the evaporative cool mist humidifier 100 includes the production of humidity by a fan 04 that draws the air in from the room and blows it over or through a moistened wick in water. Some of this water evaporates and this water vapor is added to the air which increases its humidity.

Figure 4:
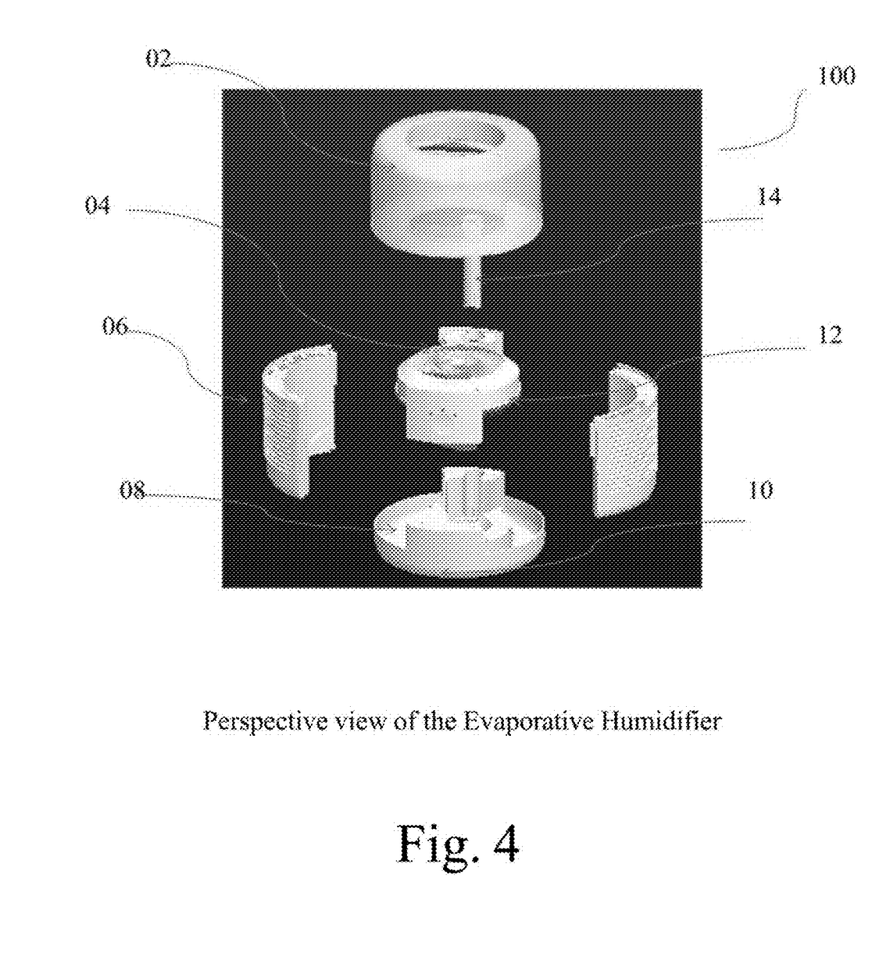
FIG. 4 shows a perspective view of the Air Purifier showing arrangements of components attached, in accordance with an embodiment of the present invention.

As shown in FIG. 4, The positioning of the wicks 06 shown is a lateral position at the external part of the evaporative humidifier air purifier combo 30 such that they are externally removable when it is to be replaced with the air filters 42 and does the other functions. It is made of a nano-permeable membrane which allows the capillary action to occur and being so, it could function according to the principle of relative humidity. In view of this, the evaporative humidifier 100 is made capable of self-controlled and automatic functionality of evaporative humidification to maintain a desired amount of humidity fit for human survival inside the workplace. For instance, when the outside air is sucked in by the fan 12, the air is absorbed by the wick and depending on the quantity of the moisture content in the air the further evaporation rate is controlled. The wick 06 on receiving the air of high moisture content from the workplace, the most of the moisture is absorbed by the wick and the fan blows out the less moist air. Similarly, when the wick 06 receives less moisture content in the air, the blowing of fan 12 causes the high evaporation rate and thus, the water from the water reservoir 08 is transferred along with the air outside the combo 30 to add more moisture to the outside less moist air. Hence, the continuous use of evaporative humidifier 100 will help in maintaining the ideal amount of humidity in the workplace. The wicks 06 used are any material of nano-permeable membrane capable to cause capillary action including but not limited to cardboard, paper, foam etc. Also, wicks 06 are adapted for easy replacement and anti-bacteria coat to protect the evaporative humidifier 100 from pest effect.

As shown in FIG. 4, the Evaporative Humidifier 100 contains the water reservoir 08 attached at the lower internal surface of the Evaporative Humidifier 100 as a water pond to provide required moisture to the Evaporation operation of the Evaporative Humidifier 100. This water reservoir 08 is attached with the water outlet pipe, which may be a siphon tube at the water outlet pipe 14 to transfer water from the water tank 02 to the water reservoir 08 to wet the wicks 06. The material of which the water tank 08, water outlet pipe 02 and water reservoir 08 is a rust resistant and bio-pesticide coated material which may be, but not limited to, a plastic, alloy, etc.

The Evaporative Humidifier Air Purifier Combo 30 has a power connection to provide electric current to the Fan 04 to initiate the operations. The power connection is not only limited to electric current but may employ other means like electromagnetic power, etc may also be employed. The improved technology not only comprises of a combo humidifier having interoperative working as evaporative humidifier and air purifier but is also adapted with the user control means as per the user requirement. The buttons 62 and indicators 64 provided at the external body of the humidifier 100 and/or air purifier 40 to employ another mean of control as per the user satisfaction depending upon the environmental condition. The button 62 is like any other ordinary switch that completes the circuit to initiate the operations, it could be a touch screen, hard button, soft button, etc. Similarly, the indicators are LED lights or blink lights to indicate the level of operation. The combo 30 (100,40) is adapted to have three level of operations which may be a low level shown as low indicator 68, medium level indicator shown as medium indicator 64 high level indicator shown as high indicator 66 attached at the frame 60 of the combo 30 (100,40).

The combo 30 system has a touch button agitator 62 to turn on the different modes of operation available for user selection. The modes are such as, low mode 68, medium mode 64 and high mode 66 which are selected using the touch button agitator 62. This touch button may be a touch button agitator, side button agitator, soft button, hard button or any such device to control the operations.

The default setting of the combo 30 is such that it is in OFF position and on pressing the touch button for four times will again be brought on the OFF position. The one time press indicates a blue light indicating Low mode 68, two time press indicates two blue light working at medium mode 64 and three time press indicates three blue lights at high mode. The color of the lights or the indicators are not limited to blue, it could be any other such color, also, the mode and level of operation can be increased or decreased by any person ordinarily skilled in the art after learning from the teachings of this novel invention.

The other indicator is a water level indicator given on the front surface of the frame 60. According to which, the water level indicator is incorporated to show a red color light when the water level is low and on filling the water it turns off the red light indicator. Hence, this is used to maintain the required level of water in the humidifier 100 without any failure.

On the low mode 68 operations, the specification of the humidifier 100 is 8 Watt, power wattage of 6-10 Watts, air purifier 40 runs at 8 Watt and fan speed 500-900 RPM, noise at 36 inches away is 55 dBA and the mist rate is 70-90 g/h. On the medium mode 64, the specification of the humidifier is 11 Watts, power wattage is 9-13 Watts, air purifier 40 runs at 11 Watts, fan speed is 800-1200 RPM, noise at 36 inches away is 60 dBA and mist rate is 110-130 g/h. On the high mode 66 operation, the specification of the humidifier is 15 Watts, power wattage is 13-17 Watts, air purifier 40 runs at 15 Watts, fan speed is 1100-1500 RPM, noise at 36 inches away is 71 dBA and mist rate is 150-170 g/h.

The humidifier 30 with a water tank size of 3.5 L at low mode 68 maximum time for unit cut off is 47 hours, at medium mode 64 maximum time for unit cut off is 30 hours and at high mode 66 maximum time for unit cut off is 22 hours.

Figure 5:
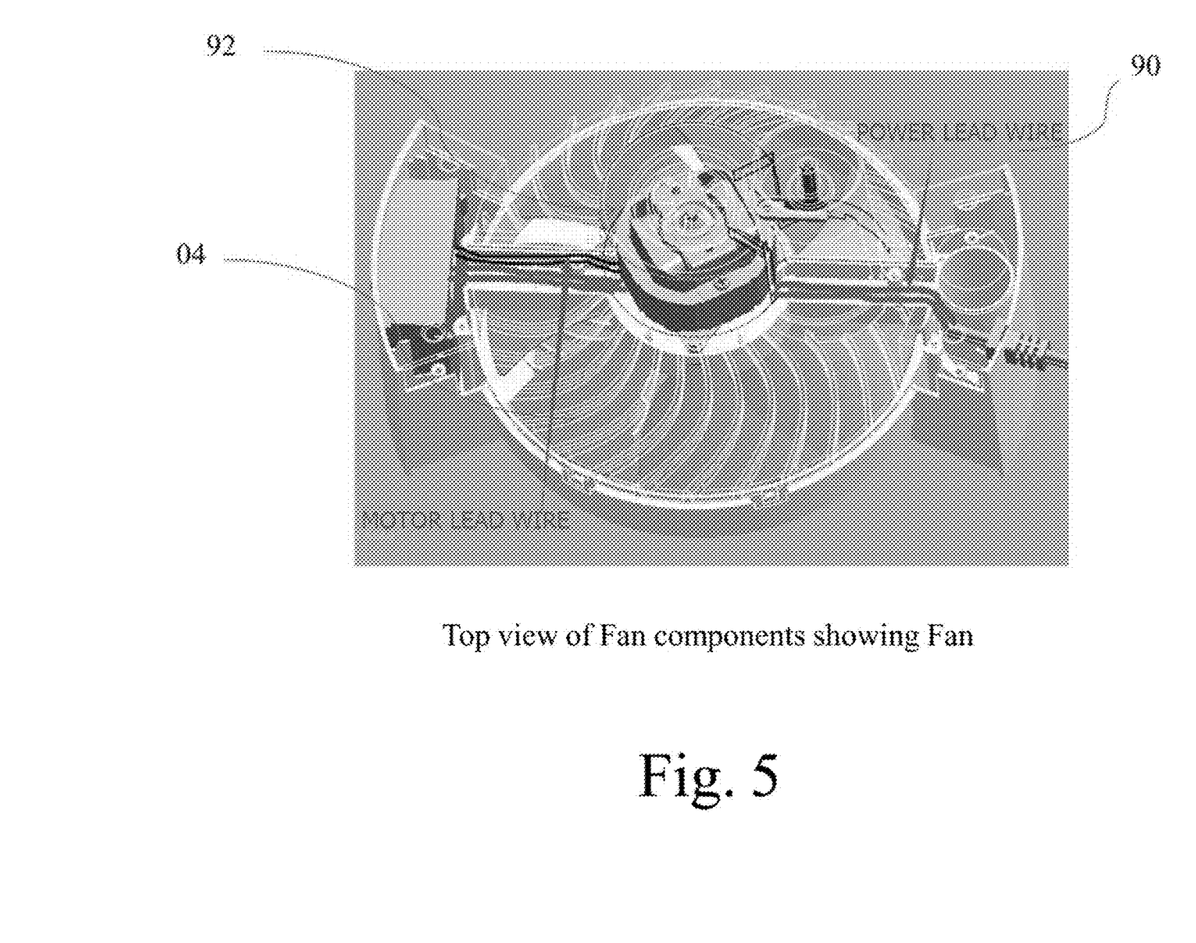
FIG. 5 shows a top view of Fan components showing Fan inside the Fan Box.
Figure 6:
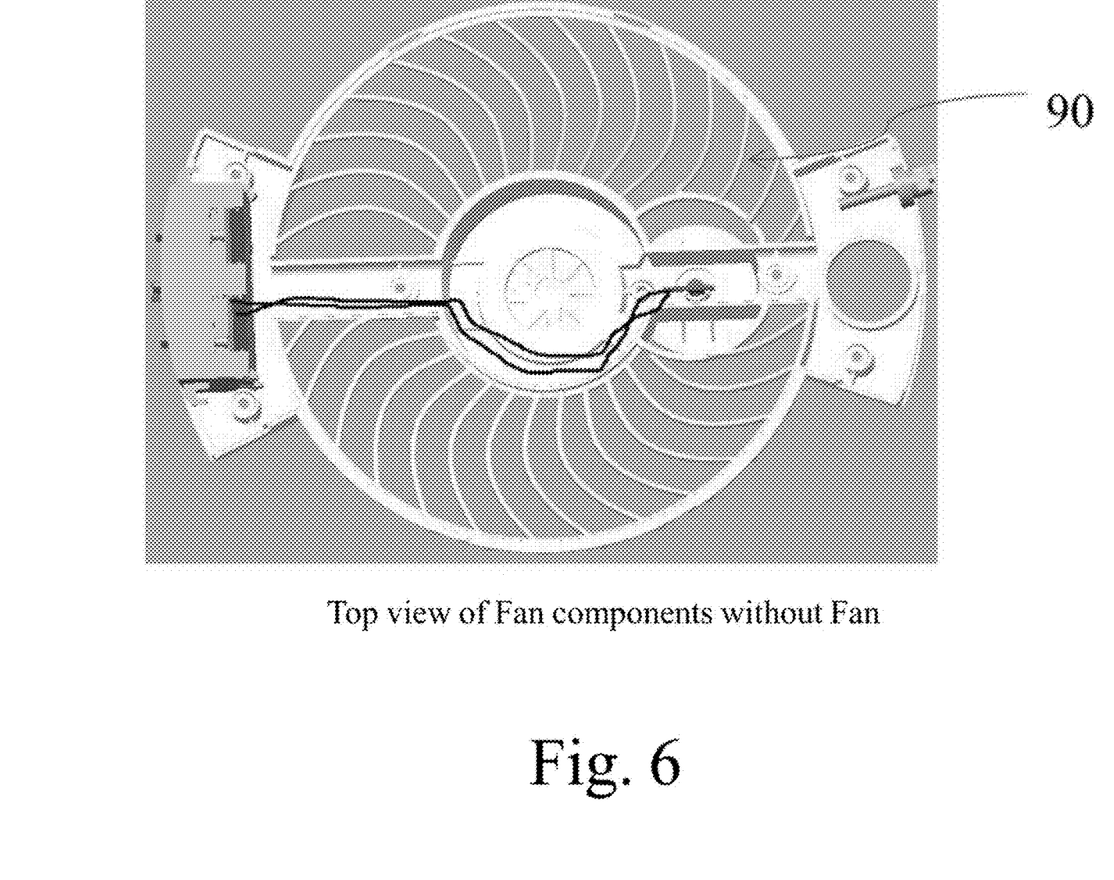
FIG. 6 shows a top view of Fan components without fan

As shown in FIG. 5, the Fan Box 90 contains the fan 04 and a motor 92 connected to a power source which may be an electric power or any other power source to conduct blowing operation of the fan 04. The motor 92 may be a 120/60 Hz operated device which may be varied depending on the specifications. Also, FIG. 6 shows a fan box unit 90 without the fan 04 to show a clear and simplified arrangement. The fan 04 is capable of working at 700 RPM at low mode, 1000 RPM at medium mode and 1300 RPM at high mode.

The functioning of the cool mist evaporative humidifier is effective as there is no water condensation on the table during the operation of Cool Mist Evaporative Humidifier 30. Another essential feature is the use of the reservoir base with peristaltic pump to wet the wick, use of a PTFE/Nano Membrane filter at air exit. The water pump is not limited to peristaltic pump it could employ any other similar pumps performing the similar function. The default function of the combo 30 is of a humidifier 100 and it has option to convert the same humidifier unit 100 to the Air purifier 40 unit with the help of attachable air purifier kit (42-40). While the air purifier kit is attached, the set of wicks 06 are replaced with the air filters 42 which may be any conventional air filters or even the same material can be used for wicks 06 and air filters 42 depending on the functional requirement and user requirement. The material may be a cardboard, paper, filter paper, PTFE, Nano-material, foam, etc.

Figure 7:
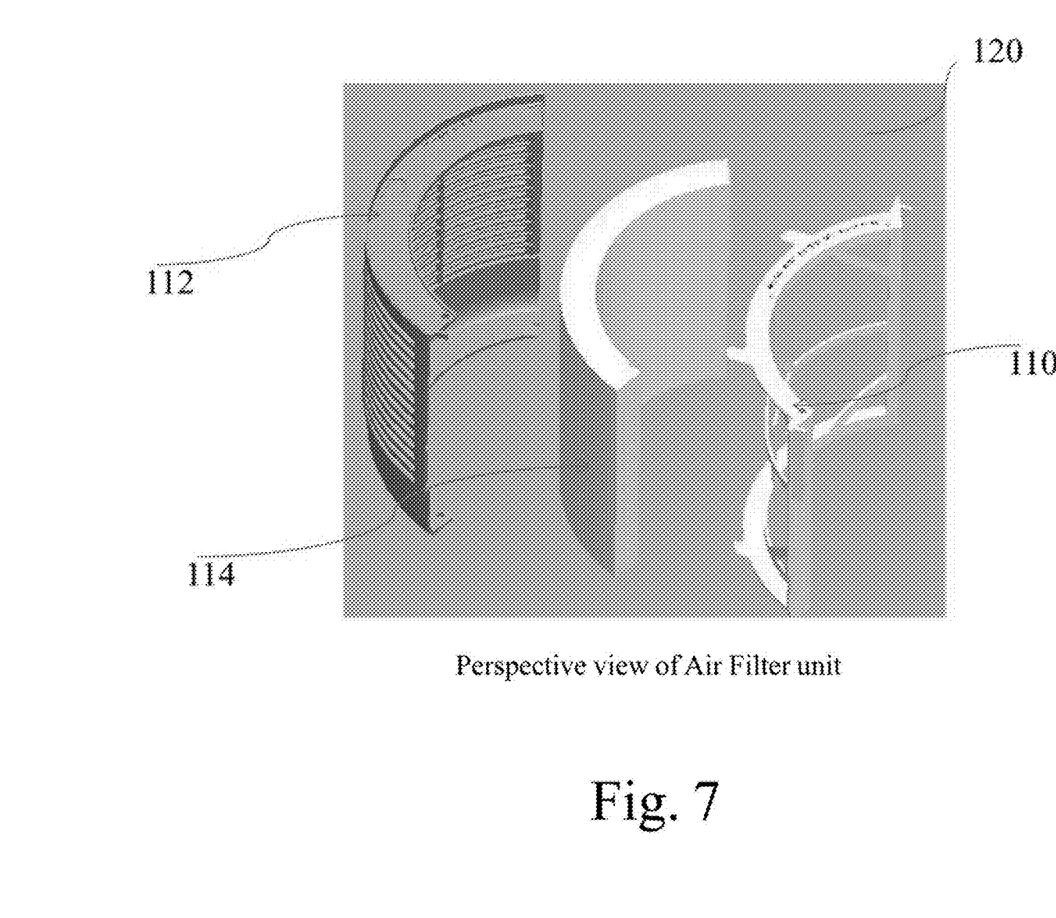
FIG. 7 shows a perspective view of Air Filter unit
Figure 8:
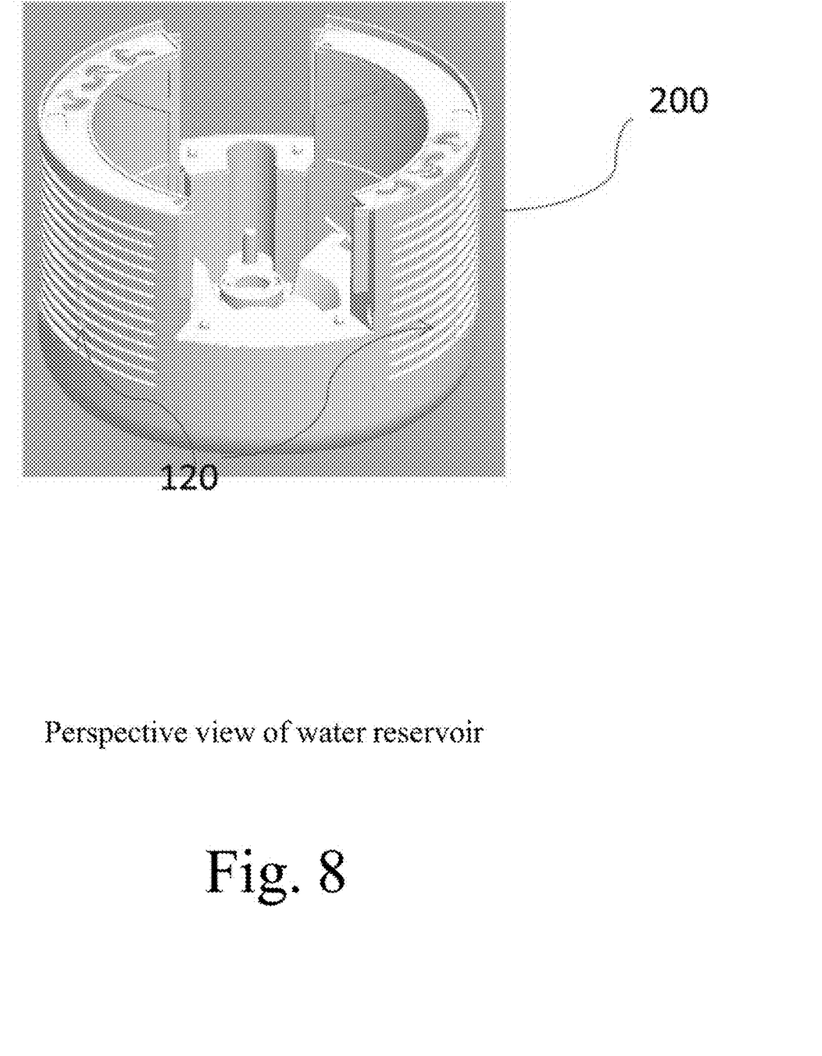
FIG. 8 shows a perspective view of water reservoir showing arrangement of removable wicks/air filter and water reservoir without water

As shown in FIG. 7, the filter unit 120 which is replaceable at the time of change in operation of the combo from the humidification to the air purification and vice versa. The filter unit comprises of a frame having external portion 82 and internal portion 84 as shown in FIG. 2 and the filter support top 112, filter support bottom 110 and the filter paper, foam or any other material for purification 114 as shown in FIG. 7. The external portion 82 and internal portion 84 are detachable form outside and mounted laterally on the combo frame 60. The filter support top 112 is mounted internally on the internal portion 84 sandwiching the filter paper 114 by pressing tightly in between to the Filter support bottom 110 mounted on the filter support top 112. The incoming air has to pass through the filter unit 120 to enter inside the humidifier 100 or the air purifier 40 and the membrane is so developed that the air passage is only one side incoming. Hence, the inside air which becomes filter and humidified does not leak outside and follows the trajectory as given by the combo 30 allowing it to pass as outgoing air from the air cover mounted at the top of the combo. As shown in FIG. 8, the filter unit 120 is mounted on the water reservoir which forms the central portion of the combo 30 (100, 40).

Figure 9:
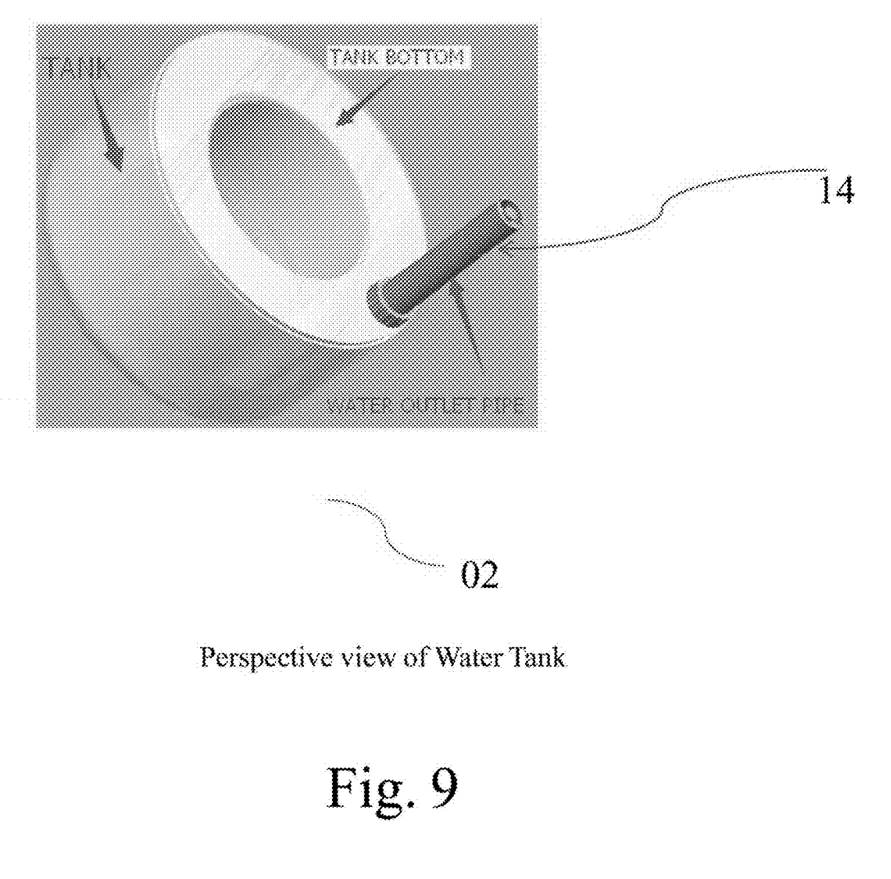
FIG. 9 shows a Perspective view of Water Tank displaying Water Outlet Pipe mounted on the Water Tank.

As shown in FIG. 9, the water tank 02 is shown in a perspective view showing the location of the water outlet pipe 14, a siphon tube type, located at the base of the water tank 02. The water outlet pipe 14 is mounted at the bottom of the water tank 02 to connect to the water reservoir 08 and allow the water to pass to the water reservoir 08 to allow humidification operation.

The present invention has at least three embodiments possible with this configuration. The other possible embodiments are also within the scope of this invention which may not have been described completely in this disclosure but whose construction is possible to one ordinarily skilled in the art after knowing this disclosure.

Figure 11:
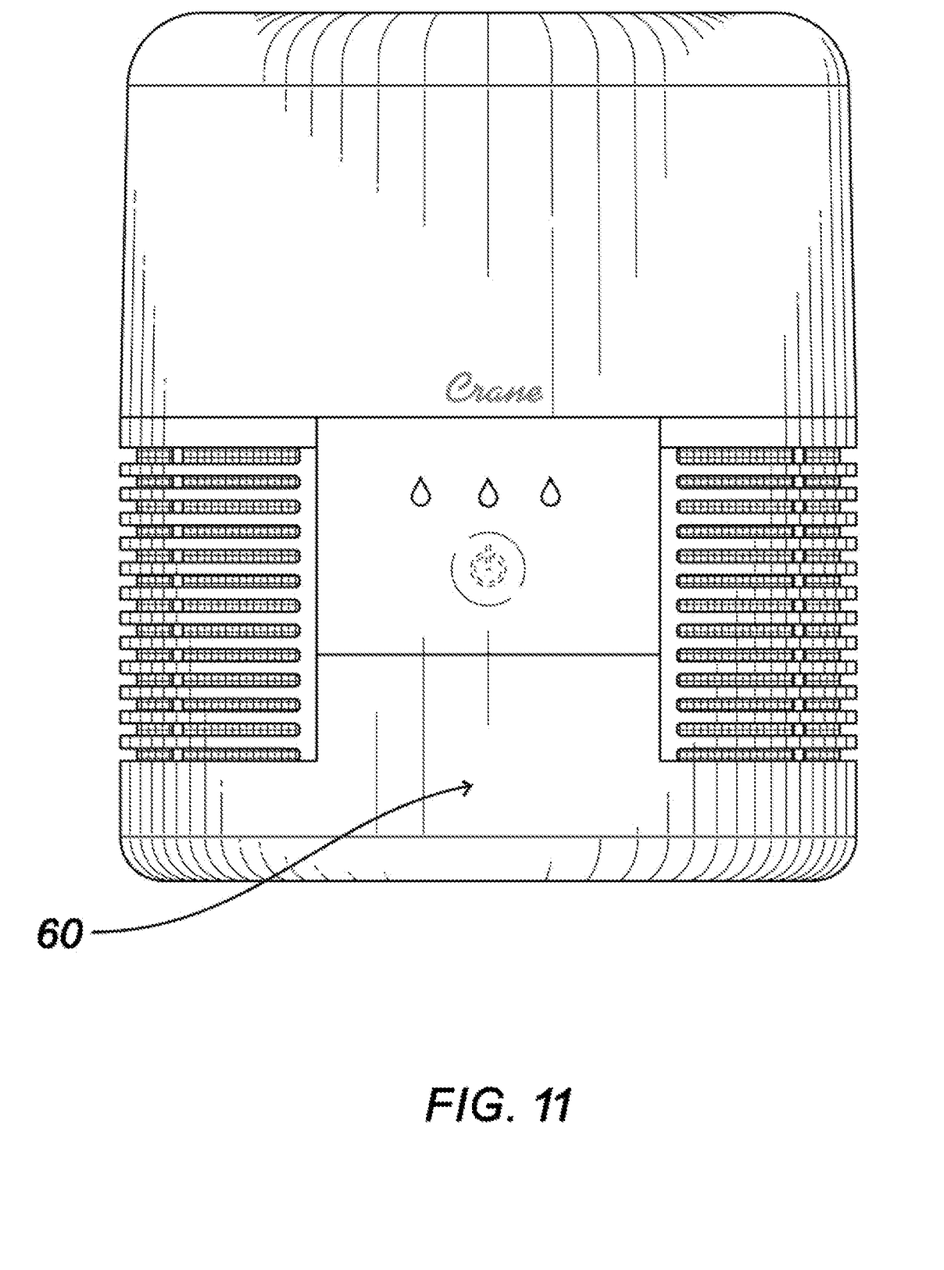
FIG. 11 shows a Front View of a Mist Evaporative Humidifier Air Purification combo

As shown in FIG. 11, the one embodiment of the invention is the combo 30 (100, 40) possible to operate combined as the air purifier 40 and evaporative humidifier 100. This combination is contained under one frame 60 having both the components of evaporative humidifier and air purifier working dependently to maintain the normal humidity and clean air inside the room. This makes use of the wicks 06 which is made of such material which can absorb the moisture content and also purify the impure air and hence, the requirement of the air filter unit is replaced with the wick arrangement 06.

Figure 10:
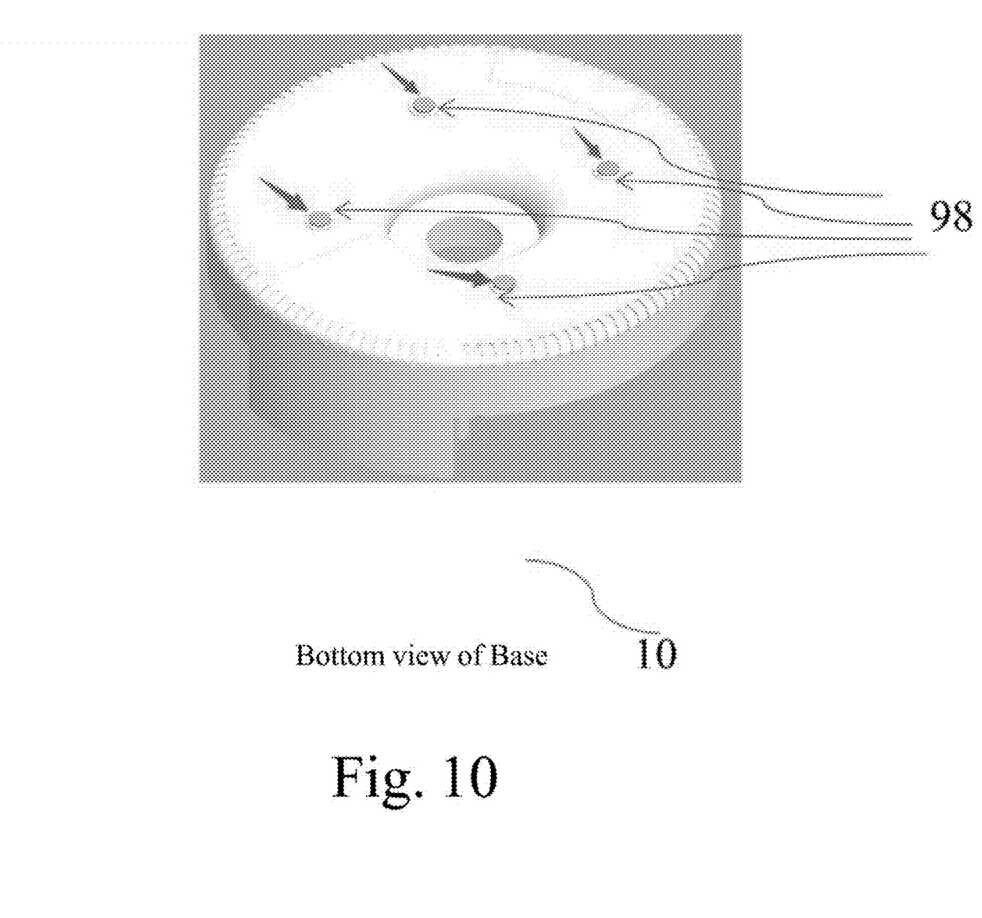
FIG. 10 shows a bottom view of the Base displaying 4 feet arrangement

The base 10 of the combo 30 unit has a four feet 98 arrangement to hold the combo 30 tightly on the floor. The four feet arrangement 98 may employ use of moveable rollers for portability of the device, fixed stand to restrict the movement, hanging system for flexibility in use, or any other system which may be employed using this arrangement.

In the first embodiment of the present invention, the evaporative humidifier-air purifier combo 30 unit is enabled to perform both of its functions i.e. humidification as well as air purification in isolation which means that the unit performs humidification function at a time while the air purification is done the other time. For the purpose of humidification, the main components which facilitate the purpose are the wick 06 and the fan 04 mounted on a double ended motor 92 which is capable of reversible CW and CCW rotation. The multilayer wick 06 being made of porous material, absorbs the water from the water reservoir or the tank and provides a large surface area for evaporation which enhances the rate of evaporation and hence the vapors are dispersed in the surroundings. Such filters can be paper, filter paper, cardboard, nano-membrane filters, Foam, etc. For performing the other function offered by the unit i.e. air filtration, the wick is completely removed from the apparatus and in its place PTFE (Poly Tetra Fluoro Ethylene) filters are fixed with no water and a slim decorative cap. These filters, being hydrophobic, are not at all wet by water and are hence unaffected. In fact, they collect particulate matter from air streams which are the incoming air in applications involving high temperature and high particulate loads such as from coal-fired power plants, cement production, steel foundries, etc.

Advantageously, this embodiment serves an additional advantage of enhancing the wick life and performance efficiency and subsequently the apparatus efficiency as the wick filters in removable and washable frames can be dried and rinsed at the time the purifying unit is in function and the FTFE Filters have been installed in order to prevent its clogging. Hence, in the combo 30 unit performs humidification 100 when installed with wick filters 06 and water and on the contrary when PTFE filters 114 are installed in place of wick filters 06, it serves the function of air purification 40.

In the second embodiment of the present invention, the evaporative humidifier-air purifier combo 30 unit is embedded with both PTFE (Poly Tetra Fluoro Ethylene) filters as well as multilayer wick filters made of porous material which absorbs water directly from the water reservoir 08 or the water tank 02 and provides a large surface area for evaporation dispersing high amount of vapors in the surroundings. The setup of the apparatus is done by providing the users with two sets of frames with the unit. The first frame is consists of only wick filters 06 which facilitates standard evaporative performance. It all depends upon the user then if he wants to avail the function of the evaporative humidifier, the frame consisting of only wick is placed with the apparatus which performs the function of evaporative humidification by dispersing the vapors produced by evaporation of water present in the water tank. The second arrangement consists of placing the frame 60 with either PTFE filters 42 or a combination of PTFE filters 42 and wick filters 06. Setting of PTFE filters alone allows the user to avail the function of air purification by the unit while the apparatus when set up with a combination of PTFE filters and wick filters 06 performs both air filtration as well as humidification. Hence, this manifestation makes the apparatus to perform humidification alone or humidification and air filtration at a time or filtration alone depending upon the requirement.

In the third embodiment of the present invention, an apparatus which consists of a single set of frames with a combination of PTFE filters 42 and wick filters 06 unlike the previous embodiments which provided for extra set of frames for optional functioning. It is so designed that it though consists of combination of both the filters but the rate of humidification offered by it is comparatively low and on the contrary, the efficiency of performance of the air filters 42 which are HEPA style air cleaners is higher. This type of arrangement serves low humidification and better air filtration 40 due to its design and the specifications of the filters employed for the respective purposes i.e. the wick filters 06 of inferior quality and HEPA cleaners of good quality. The significance of this arrangement could be better feasibility in respect to the surrounding. The space which not much dry but the air has substantially larger amount of particulates can exploit this arrangement judiciously maintaining appropriate humidity level and air conditions in the surroundings.

In the fourth embodiment of the present invention, the evaporative humidifier-air purification 30 combo neither employs a set of frames having combination of PTFE filters 42 and wick filters 06 nor does it provide for numerous sets of frames 120 having a component each. This represents a standard evaporative humidifier 100 which is installed with cotemporary fan 04 and the wick filters 06 and disperses vapors produced by the evaporation of water present in the water reservoir 08 the diameter of which may vary which depends on the requirements and the rate of the evaporation of which is enhanced by the wick filter which provides large surface area to it. The moist air which comes out of the apparatus 100 as the outgoing air is then passed through an air filter 40 which is installed at the outlet area of the humidifier 100 to purify the outgoing moist air. The filter used is preferentially HEPA type which is a type of mechanical air filter and works by forcing air through a fine mesh that traps harmful particles such as pollen, pet dander, dust mites, and tobacco smoke. This makes these filters (100, 40) the most preferred type of filters in the particular arrangement 30. The amount of the incoming moist air to the filter 100 can be regulated by the touch control panel 62 which regulates the amount of vapors formed by humidifier 30 and so the clean moist air coming out of the air filter unit is also regulated by the control panel.

In the fifth embodiment of the present invention, it uses an additional gateway filter 42 which is a charcoal filter at either the outlet of the clear outgoing moist air coming out of the HEPA filter or at the inlet of the incoming air sucked by the fan 04. The inlet air is collected in the chamber just above the water reservoir 08 the diameter of which depends upon the requirement and the design of the apparatus. The incoming air then causes evaporation as it passes through the multi-layer wick filters 06 and rises above with the help of the fan 04 which is mounted in a double ended motor 92. The moist air is then made to pass through the air filter 42 which makes it free from particulates and fit for the surroundings. The addition offered by the arrangement makes this filtered air free from odors such as smoke smell. The smell may persist even after passing through the air filters and so could make the surroundings uncomfortable. The charcoal filter 42 even purifies the contaminations which can be seen with our eyes. The other options available HEPA filters or washable open cell foam at the inlet of the air or UV filter or negative ion generator for treatment at the inlet or even the outlet which adds to the advantages of the unit and enhances the performance of the apparatus.

Advantageously, in one of the preferred embodiments described above the improvement that be added in each is to remove the water tank 02 from the humidifier apparatus 100 and fill the water directly to the water reservoir 08 which mounts a pump, not limited to, but may be a peristaltic pump to wet the wick 06 and may employ a PTFE/Nano membrane filters at the exit of the outgoing air.

Since other modifications and changes varied to fit particular operating requirements and environments are apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

Although the invention has been explained in relation to its preferred embodiment, it is to be understood that many other possible modifications and variations can be made without departing from the spirit and scope of the invention as herein described.

As one of ordinary skill in the art may appreciate, the example apparatus and method described herein can be modified. For example, certain modules/elements can be omitted, certain elements can be carried added, and other steps can be added. Although particular embodiments of the invention have been described in detail, it is understood that the invention is not limited correspondingly in scope, but includes all changes, modifications and equivalents coming within the spirit and terms of the claims appended hereto.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is to be claimed is:

1. An Evaporative Humidifier-Air Purifier combo system for controlling room humidity and purifying the air, said evaporative Humidifier-Air Purifier combo comprising:
   an Evaporative Humidifier apparatus to maintain the ideal humidity in the room, which further comprising:
   a base to mount said Evaporative Humidifier-Air Purifier combo;
   a replaceable filter support having at least two sets of wicks mounted laterally to a filter support to absorb the moisture content from an incoming air;
   a water reservoir mounted internally immediately at the base to maintain a desired quantity of water and to receive water for the replaceable set of wicks;
   a replaceable water tank mounted at the top of the humidifier to pass the water automatically from the top to the water reservoir for absorption of replaceable set of wicks;
   a water outlet pipe mounted downwardly on said water tank to pass the water to the water reservoir; and
   a motor mounted on a fan box to supply current to the combo;
   an Air Purifier apparatus to purify said entering air, which further comprising:
   a replaceable air filter unit having at least two air filter units mounted laterally to said filter support to absorb the contaminants of the incoming air;
   an air cover mounted at the top of the filter support to pass the outgoing air from the combo;
   a power source to give electric power to the said combo; and
   an output means to indicate the working condition of said combo,
Wherein said evaporative humidifier and said air purifier works intraoperative mounted on the filter support depending on selecting the use of said combo system,
Wherein said output means to indicate the working condition of said combo is a light indicator or a noise indicator.

2. The combo system as claimed in claim 1 which further comprising a fan mounted in said fan box connected to said motor by wire arrangements to receive current and an input means mounted internally and externally on said filter support.

3. The combo system as claimed in claim 2 wherein,
   said input means is a manual user selection mode having touch buttons to activate a low mode, a medium mode and a high mode,
   said input means is a rotary selector switch,
   said input means is a plurality of buttons,
   said input means is a slide selector,
   said input means is a smart panel wherein
      said smart panel is controlled manually,
      said smart panel is controlled by a cell phone, and
      said smart panel is configured to be controlled by a plurality of wireless communication devices.

4. The combo system as claimed in claim 3 wherein, said fan is an electric fan capable of producing 500-900 RPM at said low mode, 800-1200 RPM at said medium mode or 1100-1500 RPM at said high mode.

5. The combo system as claimed in claim 3 wherein, a mist rate is maintained at 70-90 g/h at said low mode, 110-130 g/h at said medium mode or 150-170 g/h at said high mode.

6. The combo system as claimed in claim 3 wherein said low mode, said medium mode and said high mode corresponds to said power source giving power wattage of 6-10 Watt, 9-13 Watt or 13-17 Watt respectively.

7. The combo system as claimed in claim 3 wherein, said low mode, said medium mode and said high mode corresponds to the noise measured at 36 inches in front of the front panel of combo as 55 dBA, 60dBA and 71dBA respectively.

8. The combo system as claimed in claim 3 wherein, said low mode, said medium mode and said high mode corresponds to a light indicator that turns on one blue LED light, turns on 2 blue LED light or turns on 3 blue LED light respectively.

9. The combo system as claimed in claim 3 wherein, said low mode, said medium mode and said high mode corresponds to a maximum time of cut off at 47 hours, 30 hours or 22 hours respectively.

10. The combo system as claimed in claim 1 wherein, said at least two sets of wicks and air filter is made of a paper, filter paper, HEPA, PTFE, open cell Foam Felt, charcoal, woven filter such as used in HVAC system, electrostatic or any combination of.

11. The combo system as claimed in claim 10 wherein, said at least two sets of wicks and/or said air filter positioned central to the longitudinal axis at the system surface are sandwiched between a filter support top and filter support bottom.

12. The combo system as claimed in claim 1 wherein, said Humidifier is always set on default as switched ON for independent working over said Air Purifier.

13. The combo system as claimed in claim 12 wherein, said humidifier is self-regulating depending on the room humidity, as the humidity of the room increases, the water vapor output naturally decreases.

14. The combo system as claimed in claim 12 wherein, the humidifier works without the water tank and uses only a water reservoir at the base with peristaltic pump to wet said at least two sets of wicks.

15. The combo system as claimed in claim 14 wherein, the humidifier employs the use of a PTFE or Nano Membrane filter at exit for the outgoing air.

16. The combo system as claimed in claim 1 wherein, said Air Purifier is set on default as switch OFF and is switchable to ON by a user selection for independent working of said Air Purifier.

17. The combo system as claimed in claim 2 wherein, said fan located adjacent to said filter unit sucks said incoming air into said air purifier and blows out upward into the room.

18. The combo system as claimed in claim 1 wherein, said base has at least four feet located at the bottom of said base.

* * * * *